Mar. 27, 1923.
J. C. WELLS.
PROCESS OF MAKING COMPOSITE RIMS FOR OPHTHALMIC MOUNTINGS.
FILED DEC. 16, 1919.
1,449,962.
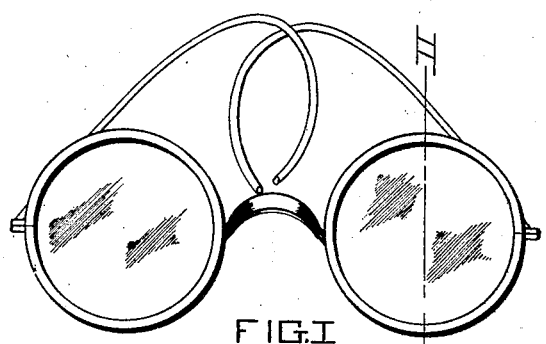
FIG. I
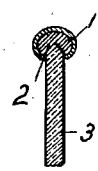
FIG. II
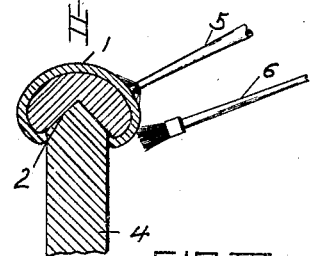
FIG. III
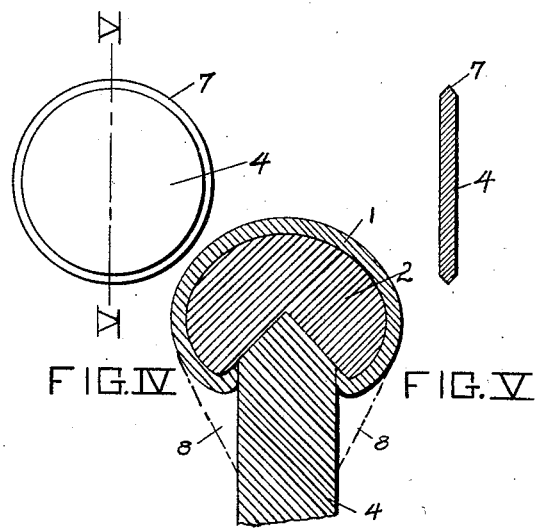
FIG. IV   FIG. V
FIG. VI
INVENTOR
JOEL C. WELLS
BY
H. H. Styll & H. K. Parsons
ATTORNEY Patented Mar. 27, 1923.

1,449,962

UNITED STATES PATENT OFFICE.

JOEL C. WELLS, OF SOUTHBRIDGE, MASSACHUSETTS.

PROCESS OF MAKING COMPOSITE RIMS FOR OPHTHALMIC MOUNTINGS.

Application filed December 16, 1919. Serial No. 345,189.

*To all whom it may concern:*

Be it known that I, JOEL C. WELLS, a citizen of the United States, residing at Southbridge, in the county of Worcester and State of Massachusetts, have invented certain new and useful Improvements in Processes of Making Composite Rims for Ophthalmic Mountings, of which the following is a specification.

This invention relates to eyeglasses, spectacles and ophthalmic mountings and has particular reference to a process of manufacturing a composite rim for the lenses, and the rim so manufactured.

The principal object of the invention is to provide means for coating the metallic rim of an ophthalmic mounting with a non-metallic substance, such as zylonite or the like, without destroying or altering the lens contacting surface of the metallic rim.

Other objects of the invention are to provide means for coating a primary rim with a protective coating, of providing means whereby the coating will be maintained on the rim even if there is no adhesion between the parts, and a rim in which the coating will be maintained on the rim but without interference with the fit and size of the lens contacting surface thereof.

Other objects and advantages of the invention should be readily apparent by reference to the following specification taken in connection with the drawings, and it will be understood that any modifications or departures may be made from the specific features disclosed or the steps of the process may be altered within the scope of the claims without departing from the spirit of the invention, the preferred form only having been described for sake of illustration.

Figure I represents a front view of a pair of spectacles embodying the invention.

Figure II is a partial cross section on line II—II of Figure I.

Figure III is an enlarged cross section similar to Figure II, showing the protective disc in position in place of the lens.

Figure IV is a front view of the protective disc.

Figure V is a cross section on line V—V of Figure IV.

Figure VI is an enlarged cross section similar to Figure III.

Eye holding rims for ophthalmic mountings composed of a metallic lens holding rim and a non-metallic rim are very extensively used. Difficulties have been experienced, however, in arranging the metallic and non-metallic parts in such a way as to prevent their accidental separation. Ordinarily these rims have been made by placing a strip or sheet of zylonite on the metallic rim and fastening the two together with mechanical fastening means, such as rivets, staples, and the like.

Zylonite, as is well known, is rather an unstable product particularly if it has not been thoroughly cured. It will change its conditions with temperature changes as it will warp, twist, expand, etc. Therefore, mechanical holdings have not proved very satisfactory in a great many instances as the zylonite rim will pull away from the metal rim or slip or crawl on the same.

Some attempts have been made to coat the zylonite on the metal instead of placing it on in sheet form, and this has been done by painting the metal rim with ordinary liquid celluloid and other cellulose compounds, but difficulty has been experienced in placing the non-metallic coating on the metal in such a way as to give the desired smooth and even appearance and not interfere with the size of the metallic lens holding rims.

Lenses for eyeglasses are manufactured to standard sizes or gages and the lens holding rims for ophthalmic mountings have also been made to this standard so that the lenses may be interchangeable with the frames of any standard size. It is, therefore, apparent that if the liquid celluloid or other material flows over onto the lens holding section of the metallic rim this standard size will no longer obtain and that the standard lenses will not fit the frame.

In my invention I have provided means for coating the metallic rim in such a way that the lens holding area of the metallic eye wire will be preserved and maintained, and I have also provided means by which the metallic rims may be conveniently held while the coating process is going on.

Referring to the drawings, Figure I shows a front view of an ordinary pair of spectacles embodying composite rims made in accordance with my invention.

Figure II shows a cross section on line II—II of Figure I, in which 1 is the non-metallic rim portion; 2 is the metallic rim portion, and 3 is the lens.

As shown in Figure III, the non-metallic coating 1 may be placed on the metal rim either by means of a spray 5 or by a brush 6. Before starting the coating operation, however, I place in the metal rim 2 the protective disc 4 shown in Figures IV and V. This disc is the exact size of the standard lens and has the standard lens bevel 7 around its periphery. This protective plate 4 also exactly fits the lens holding area of the metallic rim 2.

After the protective plate 4 has been placed in the metallic rim 2, I next proceed to coat the rims with liquid celluloid or other liquid compound, the protective plate preventing the liquid coating from coming in contact with the lens area and also providing means by which the rim may be held and supported while the coating operation is going on and while the coat is drying, thus insuring an even coating whose surface is unmarred and also insuring the exact standard size of the lens holding area.

By reference to Figure VI it will be noted that the edges of the metallic rim 2 extend beyond the faces of the disc 4. The liquid celluloid will, therefore, fill in between the overhang of the metal rim and the sides of the disc thus preventing the celluloid rim from coming off of the metallic rim, even if there were no adhesion between the celluloid and metallic rims. It will also be clear that the liquid celluloid will extend down on the disc 4, as indicated in dot and dash lines at 8. The portion between the dot and dash lines and the solid lines of the celluloid rim may be cut off before removing the disc and the cut portion shaped to desired form and size.

From the foregoing it will be seen that I have provided means for coating a metallic lens rim in which the standard size of the lens holding metallic rim is maintained and also in which the exact size is maintained while the coating is drying. The supporting value of the protective disc is apparent as it prevents the metallic rim from warping or twisting out of shape during the drying operation of the coating which may warp out of shape if unsupported.

I claim:

1. The process of producing a composite rim for an ophthalmic mounting, consisting in forming a metal rim with a lens receiving groove, constructing a plate in the simulation of a lens, mounting the plate within the groove, building up a liquid coat of appreciable thickness on the rim, the plate preventing access of the fluid to the groove, hardening the coat, and subsequently removing the plate whereby the coat will conceal the rim and make tight joint with a lens when inserted therein.

2. The process of forming a composite rim for ophthalmic mountings, consisting in forming an eye wire with a lens receiving groove, forming a plate in the simulation of a lens, mounting the plate within the rim, applying a heavy liquid coating to the rim which when hardened will produce a composition covering thereon, removing excess of coating adjacent the inserted plate, and subsequently removing the plate itself, whereby a non-coated standard size lens receiving groove remains in the coated frame.

3. The process of producing an ophthalmic frame, consisting in forming an original metal frame with a lens receiving groove and building up a heavy composition covering thereon through successive applications of the covering material in liquid form to the ungrooved portion of the frame and excluding the covering material from the lens receiving groove, substantially as and for the purpose described.

4. The process of manufacturing a composite rim for ophthalmic mountings comprising making a metallic eye wire, making a protective plate of less width than the metallic eye wire, placing the protective plate in the metallic eye wire so that the sides of the metal eye wire overhang the sides of the protective plate, coating the exposed portions of the metal eye wire with a hardening substance in liquid form, and removing the undesired surplus of the hardening material between the protective plate and the overhang of the metal eye wire and subsequently withdrawing the metal plate from the groove.

In testimony whereof I have affixed my signature, in presence of two witnesses.

JOEL C. WELLS.

Witnesses:
HARRY H. STYLL,
H. K. PARSONS.